US010019998B2

(12) United States Patent
Bilobrov et al.

(10) Patent No.: US 10,019,998 B2
(45) **Date of Patent: *Jul. 10, 2018**

(54) DETECTING DISTORTED AUDIO SIGNALS BASED ON AUDIO FINGERPRINTING

(71) Applicant: Facebook, Inc., Menlo Park, CA (US)

(72) Inventors: Sergiy Bilobrov, Santa Clara, CA (US); Maksim Khadkevich, London (GB)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/181,034

(22) Filed: Jun. 13, 2016

(65) Prior Publication Data

US 2016/0300579 A1 Oct. 13, 2016

Related U.S. Application Data

(63) Continuation of application No. 14/153,404, filed on Jan. 13, 2014, now Pat. No. 9,390,727.

(51) Int. Cl.

| | |
|---|---|
| ***G06F 17/00*** | (2006.01) |
| ***G10L 19/018*** | (2013.01) |
| ***G10L 25/51*** | (2013.01) |
| ***G10L 25/27*** | (2013.01) |
| ***G10L 25/06*** | (2013.01) |

(52) U.S. Cl.
CPC ............ *G10L 19/018* (2013.01); *G10L 25/06* (2013.01); *G10L 25/27* (2013.01); *G10L 25/51* (2013.01)

(58) Field of Classification Search
CPC ....... G10L 19/018; G10L 25/06; G10L 25/27; G10L 25/51
See application file for complete search history.

(56) References Cited

U.S. PATENT DOCUMENTS

| | | | | |
|---|---|---|---|---|
| 9,390,727 | B2 * | 7/2016 | Bilobrov | G10L 19/018 |
| 2007/0014428 | A1 * | 1/2007 | Kountchev | G06T 1/0028 382/100 |
| 2012/0209612 | A1 | 8/2012 | Bilobrov | |

OTHER PUBLICATIONS

Haitsma, J. et al., "Robust Audio Hashing for Content Identification," Content-Based Multimedia Indexing (CBMI), 2001, nine pages.

(Continued)

*Primary Examiner* — Joseph Saunders, Jr.
(74) *Attorney, Agent, or Firm* — Fenwick & West LLP

(57) ABSTRACT

An audio identification system generates a probe audio fingerprint of an audio signal and determines amount of pitch shifting in the audio signal based on analysis of correlation between the probe audio fingerprint and a reference audio fingerprint. The audio identification system applies a time-to-frequency domain transform to frames of the audio signal and filters the transformed frames. The audio identification system applies a two-dimensional discrete cosine transform (DCT) to the filtered frames and generates the probe audio fingerprint from a selected number of DCT coefficients. The audio identification system calculates a DCT sign-only correlation between the probe audio fingerprint and the reference audio fingerprint, and the DCT sign-only correlation closely approximates the similarity between the audio characteristics of the probe audio fingerprint and those of the reference audio fingerprint. Based on the correlation analysis, the audio identification system determines the amount of pitch shifting in the audio signal.

16 Claims, 11 Drawing Sheets

(56) References Cited

OTHER PUBLICATIONS

Ito, I. et al., "DCT Sign-Only Correlation With Application to Image Matching and the Relationship With Phase-Only Correlation," Acoustics, Speech and Signal Processing, ICASSP 2007, 2007, pp. I-1237 to I-1240.

Wang, A., "An Industrial-Strength Audio Search Algorithm," ISMIR 2003, Proceedings of the Fourth International Conference on Music Information Retrieval, Oct. 26-30, 2013, pp. 7-13, Baltimore, Maryland, USA.

United States Office Action, U.S. Appl. No. 14/153,404, dated Nov. 6, 2015, 17 pages.

* cited by examiner

DETECTING DISTORTED AUDIO SIGNALS BASED ON AUDIO FINGERPRINTING

CROSS-REFERENCE TO RELATED APPLICATIONS

This application is a continuation application of U.S. application Ser. No. 14/153,404, filed on Jan. 13, 2014, which is hereby incorporated by reference in its entirety.

BACKGROUND

This disclosure generally relates to audio identification, and more specifically to detecting distorted audio signals based on audio fingerprinting.

An audio fingerprint is a compact summary of an audio signal that can be used to perform content-based identification. For example, existing audio signal identification systems use various audio signal identification schemes to identify the name, artist, and/or album of an unknown song. When presented with an unidentified audio signal, an audio signal identification system is configured to generate an audio fingerprint for the audio signal, where the audio fingerprint includes characteristic information about the audio signal usable for identifying the audio signal. The characteristic information about the audio signal may be based on acoustical and perceptual properties of the audio signal. Using fingerprints and matching algorithms, the audio fingerprint generated from the audio signal is compared to a database of reference audio fingerprints for identification of the audio signal.

Audio fingerprinting techniques should be robust to a variety of distortions due to noisy transmission channels or specific sound processing. Pitch shifting and tempo shifting are two of the most common and problematic types of distortions to most existing audio identification systems based on analysis of spectral content. Pitch shifting refers to raising or lowering the original pitch of an audio signal. When pitch shifting occurs, all the frequencies of the audio signal in the spectrum are multiplied by a factor. Tempo shifting or variation refers to a playing an audio signal slower or faster than its original speed. Since spectral content of an audio signal is either stretched along the time axis (tempo variations or shifting) or shifted along the frequency axis (pitching shifting), existing audio identification solutions based on the analysis of spectral content are often not robust enough to accurately identify distorted versions of an audio signal.

Various existing solutions are provided by audio identification systems to detect distorted versions of audio signals, such as solutions involving computing Hamming distance between two sub-fingerprints of audio signals. Using a lower Hamming distance as a threshold, a higher matching rate between the sub-fingerprints will be found. However, a pitch shift can lead to significant changes in spectral content of an audio signal, resulting in a high Hamming distance and consequently a low matching rate. One of the possible solutions is to extract several indexes, each corresponding to a given pitch shift, and to then match a sub-fingerprint being evaluated to all the indexes. However, this approach introduces additional computational load to the matching process and additional space to store multiple fingerprint versions.

SUMMARY

To identify audio signals, an audio identification system generates probe audio fingerprints for the audio signals. The audio identification system generates a probe audio fingerprint of an audio signal by applying a time-to-frequency domain transform, e.g., a Short-Time Fourier Transform (STFT) to one or more frames of the audio signal. The transformed frames are filtered by a band-pass filter, such as a 16-band third-octave filter bank, Mel-frequency filter bank, or any similar filter banks, by the audio identification system. The band-pass filtering generates multiple subsamples corresponding to different frequency bands of the audio signal.

The audio identification system applies a two-dimensional discrete cosine transform (DCT) to the filtered frames to generate a matrix of DCT coefficients, each of which has sign information. The audio identification system selects a number of DCT coefficients, e.g., 64 DCT coefficients from the first 4 even columns of the matrix of DCT coefficients. To compactly represent the probe audio fingerprint, e.g., representing the probe audio fingerprint as a 64-bit integer, the audio identification system only keeps the sign information of the selected DCT coefficients to represent the probe audio fingerprint.

To detect distortion (e.g., pitch shifting) in the audio signal, the audio identification system calculates a DCT sign-only correlation between the probe audio fingerprint and a reference audio fingerprint. The audio identification system applies a DCT transform on the columns of DCT sign coefficients of the probe audio fingerprint and corresponding DCT sign coefficients of the reference audio signal to generate the DCT sign-only correlation. The DCT sign-only correlation closely approximates the similarity between the audio characteristics of the probe audio fingerprint and those of the reference audio fingerprint.

The audio identification system analyzes the DCT sign-only correlation between the probe audio fingerprint and the reference audio fingerprint to determine whether the probe audio fingerprint matches the reference audio fingerprint. For example, responsive to the absolute peak value of the DCT sign-only correlation function exceeding a threshold value, the audio identification system determines that the probe audio fingerprint matches the reference audio fingerprint. From the position of the absolute peak value in the DCT sign-only correlation function, the audio identification system determines the amount of pitch shifting in the audio signal. Thus, DCT sign-only correlation based audio fingerprint matching can be used to detect pitch shifted versions of audio signals where distance based, e.g., Hamming distance, matching algorithms fail to the detect such pitch shifted versions of audio signals.

The features and advantages described in this summary and the following detailed description are not all-inclusive. Many additional features and advantages will be apparent to one of ordinary skill in the art in view of the drawings, specification, and claims hereof.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Figure 1:
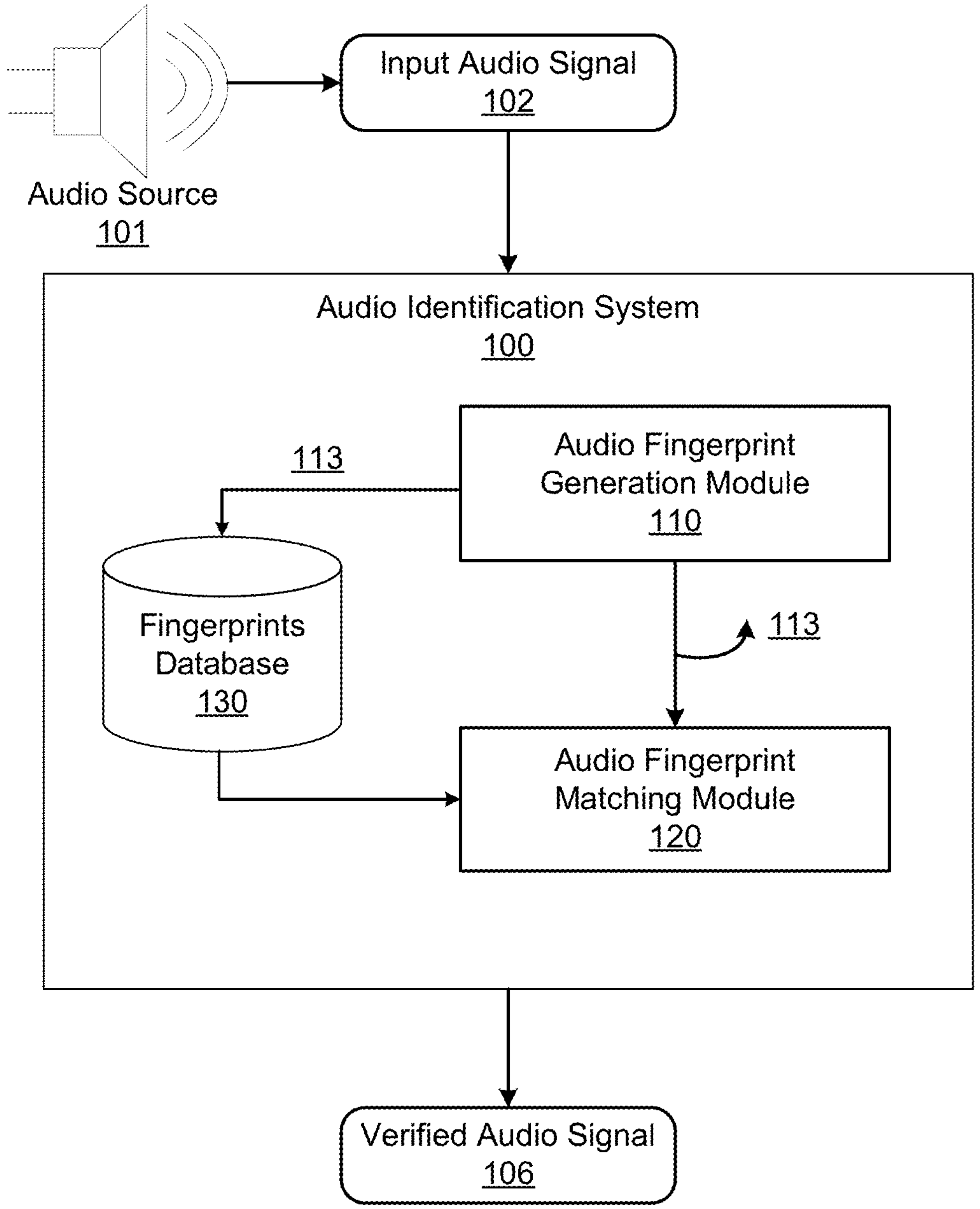
FIG. 1 is a block diagram of a process for identifying audio signals in accordance with an embodiment.

Embodiments of the invention enable the robust identification of audio signals based on audio fingerprints. FIG. 1 shows an example embodiment of an audio identification system 100 identifying an audio signal 102. As shown in FIG. 1, the audio identification system 100 has an audio fingerprint generation module 110, an audio fingerprint matching module 120 and a fingerprints database 130. The audio identification system 100 receives an audio signal 102 generated by an audio source 101, generates an audio fingerprint of the audio signal 102 by the audio fingerprint generation module 110, matches the generated audio fingerprint with one or more reference audio fingerprints stored in the fingerprints database 130 and outputs an verified audio signal 106.

As shown in FIG. 1, an audio source 101 generates the audio signal 102. The audio source 101 may be any entity suitable for generating audio (or a representation of audio), such as a person, an animal, speakers of a mobile device, a desktop computer transmitting a data representation of a song, or other suitable entity generating audio. The audio signal 102 comprises one or more discrete audio frames, each of which corresponds to a fragment of the audio signal 102 at a particular time. Hence, each audio frame of the audio signal 102 corresponds to a length of time of the audio signal 102, such as 25 ms, 50 ms, 100 ms, 200 ms, etc.

Upon receiving the one or more audio frames of the audio signal 102, the audio fingerprint generation module 110 generates an audio fingerprint 113 from one or more of the audio frames of the audio signal 102. For simplicity and clarity, the audio fingerprint 113 of the audio signal 102 is referred to as a "probe audio fingerprint" throughout the entire description. The probe audio fingerprint 113 of the audio signal 102 may include characteristic information describing the audio signal 102. Such characteristic information may indicate acoustical and/or perceptual properties of the audio signal 102. To generate the probe audio fingerprint 113 of the audio signal 102, the audio fingerprint generation module 110 preprocesses the audio signal 102, transforms the audio signal 102 from one domain to another domain, filters the transformed audio signal and generates the audio fingerprint from the further transformed audio signal. One embodiment of the audio fingerprint generation module 110 is further described with reference to FIG. 3 and FIG. 4.

To detect a distorted version of the audio signal 102, the audio fingerprint matching module 120 matches the probe audio fingerprint 113 of the audio signal 102 against a set of reference audio fingerprints stored in the fingerprints database 130. To match the probe audio fingerprint 113 to a reference audio fingerprint, the audio fingerprint matching module 120 calculates a correlation between the probe audio fingerprint 113 and the reference audio fingerprint. The correlation measures the similarity between the audio characteristics of the probe audio fingerprint 113 of the audio signal 102 and the audio characteristics of the reference audio fingerprint. The audio fingerprint matching module 120 determines whether the audio signal 102 is distorted based on the similarity. One embodiment of the audio fingerprint matching module 120 is further described with reference to FIG. 5 and FIG. 6.

The fingerprints database 130 stores probe audio fingerprints of audio signals and/or one or more reference audio fingerprints, which are audio fingerprints generated from one or more reference audio signals. Each reference audio fingerprint in the fingerprints database 130 is also associated with identifying information and/or other information related to the audio signal from which the reference audio fingerprint was generated. The identifying information may be any data suitable for identifying an audio signal. For example, the identifying information associated with a reference audio fingerprint includes title, artist, album, publisher information for the corresponding audio signal. Identifying information may also include data indicating the source of an audio signal corresponding to a reference audio fingerprint. For example, the reference audio signal of an audio-based advertisement may be broadcast from a specific geographic location, so a reference audio fingerprint corresponding to the reference audio signal is associated with an identifier indicating the geographic location (e.g., a location name, global positioning system (GPS) coordinates, etc.).

In one embodiment, the fingerprints database 130 stores indices of the reference audio fingerprints. Each index associated with a reference audio fingerprint may be computed from a portion of the corresponding reference audio fingerprint. For example, a set of bits from a reference audio fingerprint corresponding to low frequency coefficients in the reference audio fingerprint may be used as the reference audio fingerprint's index.

System Architecture

Figure 2:
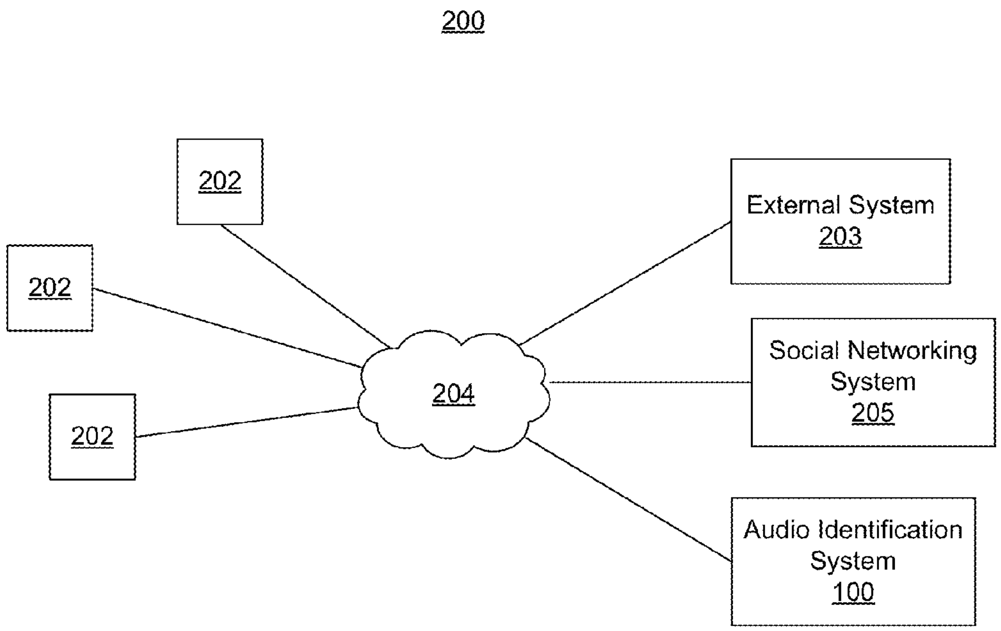
FIG. 2 is a block diagram of an audio identification system in accordance with an embodiment.

FIG. 2 is a block diagram illustrating one embodiment of a system environment 200 including an audio identification system 100. As shown in FIG. 2, the system environment 200 includes one or more client devices 202, one or more external systems 203, the audio identification system 100 and a social networking system 205 connected through a network 204. While FIG. 2 shows three client devices 202, one social networking system 205, and one external system 203, it should be appreciated that any number of these entities (including millions) may be included. In alternative configurations, different and/or additional entities may also be included in the system environment 200. Furthermore, in some embodiments, the audio identification system 100 can be a system or module running on or otherwise included within one of the other entities shown in FIG. 2.

A client device 202 is a computing device capable of receiving user input, as well as transmitting and/or receiving data via the network 204. In one embodiment, a client device 202 sends a request to the audio identification system 100 to identify an audio signal captured or otherwise obtained by the client device 202. The client device 202 may additionally provide the audio signal or a digital representation of the audio signal to the audio identification system 100. Examples of client devices 202 include desktop computers, laptop computers, tablet computers (pads), mobile phones, personal digital assistants (PDAs), gaming devices, or any other device including computing functionality and data communication capabilities. Hence, the client devices 202 enable users to access the audio identification system 100, the social networking system 205, and/or one or more external systems 203. In one embodiment, the client devices 202 also allow various users to communicate with one another via the social networking system 205.

The network 204 may be any wired or wireless local area network (LAN) and/or wide area network (WAN), such as an intranet, an extranet, or the Internet. The network 204 provides communication capabilities between one or more client devices 202, the audio identification system 100, the social networking system 205, and/or one or more external systems 203. In various embodiments the network 204 uses standard communication technologies and/or protocols. Examples of technologies used by the network 204 include Ethernet, 802.11, 3G, 4G, 802.16, or any other suitable communication technology. The network 204 may use wireless, wired, or a combination of wireless and wired communication technologies. Examples of protocols used by the network 204 include transmission control protocol/Internet protocol (TCP/IP), hypertext transport protocol (HTTP), simple mail transfer protocol (SMTP), file transfer protocol (TCP), or any other suitable communication protocol.

The external system 203 is coupled to the network 204 to communicate with the audio identification system 100, the social networking system 205, and/or with one or more client devices 202. The external system 203 provides content and/or other information to one or more client devices 202, the social networking system 205, and/or to the audio identification system 100. Examples of content and/or other information provided by the external system 203 include identifying information associated with reference audio fingerprints, content (e.g., audio, video, etc.) associated with identifying information, or other suitable information.

The social networking system 205 is coupled to the network 204 to communicate with the audio identification system 100, the external system 203, and/or with one or more client devices 202. The social networking system 205 is a computing system allowing its users to communicate, or to otherwise interact, with each other and to access content. The social networking system 205 additionally permits users to establish connections (e.g., friendship type relationships, follower type relationships, etc.) between one another. Though the social networking system 205 is included in the embodiment of FIG. 2, the audio identification system 100 can operate in environments that do not include a social networking system, including within any environment for which detection of distortion of audio signals is desirable.

In one embodiment, the social networking system 205 stores user accounts describing its users. User profiles are associated with the user accounts and include information describing the users, such as demographic data (e.g., gender information), biographic data (e.g., interest information), etc. Using information in the user profiles, connections between users, and any other suitable information, the social networking system 205 maintains a social graph of nodes interconnected by edges. Each node in the social graph represents an object associated with the social networking system 205 that may act on and/or be acted upon by another object associated with the social networking system 205. An edge between two nodes in the social graph represents a particular kind of connection between the two nodes. For example, an edge may indicate that a particular user of the social networking system 205 is currently "listening" to a certain song. In one embodiment, the social networking system 205 may use edges to generate stories describing actions performed by users, which are communicated to one or more additional users connected to the users through the social networking system 205. For example, the social networking system 205 may present a story about a user listening to a song to additional users connected to the user.

Discrete Cosine Transform (DCT) Based Audio Fingerprint Generation

Figure 3:
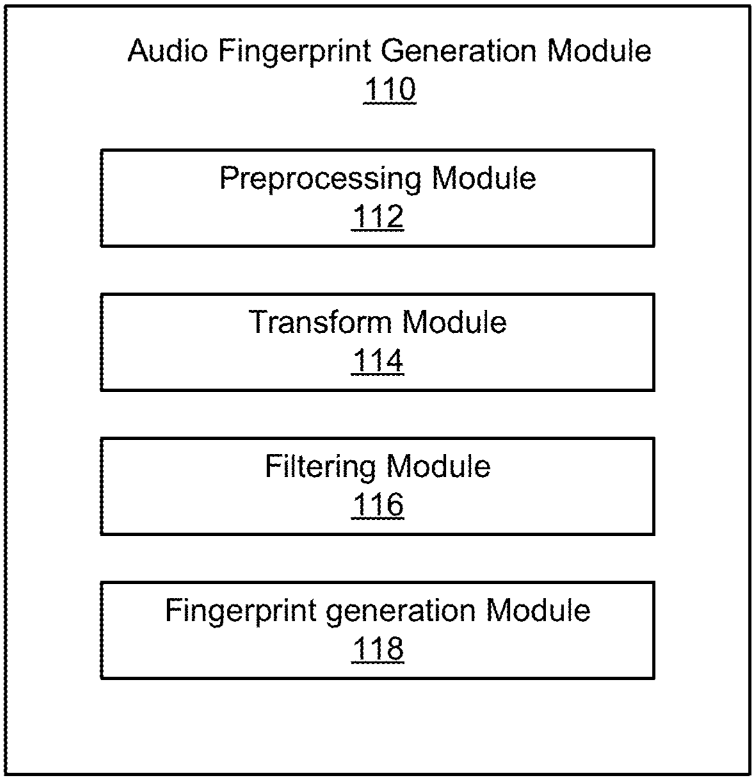
FIG. 3 is a block diagram of an audio fingerprint generation module in accordance with an embodiment.

To detect audio signals with pitch shifting, the audio identification system 100 generates audio fingerprints of the audio signals based on DCT transform and filtering of the audio signals. FIG. 3 is a block diagram of an audio fingerprint generation module 110 in accordance with an embodiment of the invention. The audio fingerprint generation module 110 is configured to preprocess an audio signal, transform the audio signal from time domain to frequency domain, filter the transformed audio signal and generate the audio fingerprint from the further transformed audio signal. In the embodiment illustrated in FIG. 3, the audio fingerprint generation module 110 has a preprocessing module 112, a transform module 114, a filtering module 116 and a fingerprint generation module 118. Other embodiments of the audio fingerprint module 110 may have additional and/or different modules. In addition, the functions may be distributed among the modules in a different manner than described herein.

The preprocessing module 112 receives an audio signal and preprocesses the received audio signal for audio fingerprint generation. In one embodiment, the preprocessing module 112 converts the audio signal into multiple audio features and selects a subset of the audio features to be used in generating an audio fingerprint for the audio signal. Other examples of audio signal preprocessing include analog-to-digital conversion if the audio signal is in analog representation, extracting metadata associated with the audio signal, coding/decoding the audio signal for mobile applications, normalizing the amplitude (e.g., bounding the dynamic range of the audio signal to a predetermined range) and dividing the audio signal into multiple audio frames corresponding to the variation velocity of the underlying acoustic events of the audio signal. The preprocessing module 112 may perform other audio signal preprocessing operations known to those of ordinary skills in the art.

The transform module 114 transforms the audio signal from one domain to another domain for efficient signal compression and noise removal in audio fingerprint generation. In one embodiment, the transform module 114 transforms the audio signal from time domain to frequency domain by applying a Short-Time Fourier Transform (STFT). Other embodiments of the transform module 114 may use other types of time-to-frequency transforms. Based on the time-to-frequency domain transform of the audio signal, the transform module 114 obtains power spectrum information for each frame of the audio signal over a range of frequencies, such as 250 to 2250 Hz.

Let x[n] be a discrete audio signal in the time domain sampled at a sampling frequency $F_s$. x[n] is divided into frames with frame step p samples. For a frame, corresponding to sample t, STFT transform is performed on the audio signal weighted by a window function w[n] as follows in Equation (1):

$$X[t,k]=\Sigma_{n=0}^{M-1}w[n]x[n+t]e^{-2\pi jnk/M} \quad (1)$$

where parameter k and parameter M denote a bin number and the window size, respectively.

Figure 7:
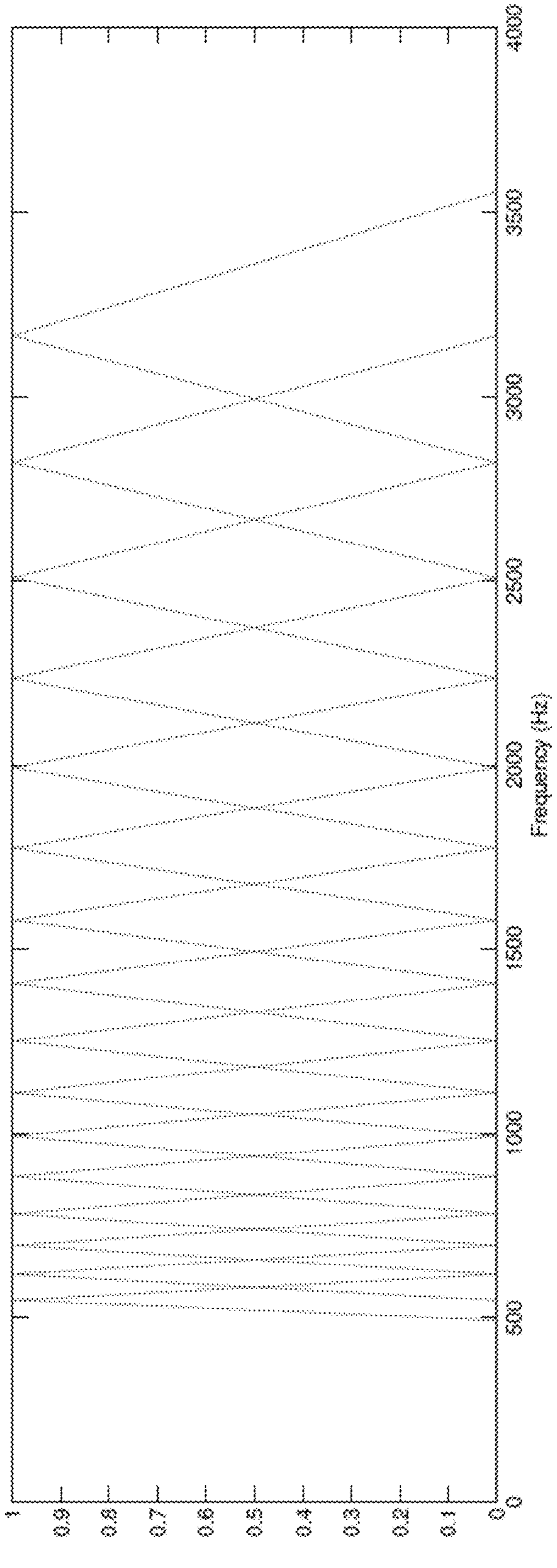
FIG. 7 is an example filter bank configuration for audio signal fingerprint generation in accordance with an embodiment.

The filtering module 116 receives the transformed audio signal and filters the transformed audio signal. In one embodiment, the filtering module 116 applies a B-band third octave triangular filter bank to each spectral frame of the transformed audio signal. Other embodiments of the filtering module 116 may use other types of filter banks. In a third-octave filter bank, spacing between centers of adjacent bands is equal to one-third octave. In one embodiment, the center frequency $f_c[k]$ of k-th filter is defined as in Equation (2)

$$f_c[k]=2^{k/3}F_0 \quad (2)$$

where parameter $F_0$ is set to 500 Hz and the number of filter banks, B, is set to 16. The upper and lower band edges in the k-th band are equal to the central frequencies of the next and the previous bands, respectively. By applying the band-pass filters, multiple sub-band samples corresponding to different frequency bands of the audio signal are generated. FIG. 7 is an example filter bank configuration for audio signal fingerprint generation in accordance with an embodiment of the invention.

Let fb[i] be the output of filter bank after processing i-th frame. fb[i] consists of B bins, each bin containing spectral power of the corresponding spectral bandwidth. A sequence of $N_{fb}$ consecutive frames containing spectral power starting from fb[i] is used to generate a sub-fingerprint $F_{sub}[i]$. In one embodiment, the number of consecutive frames $N_{fb}$ is set to 32. Upon filtering the transformed audio signal, the filtering module 116 obtains a $B\times N_{fb}$ matrix and normalizes the $B\times N_{fb}$ matrix by row to remove possible equalization effect in the audio signal.

The fingerprint generation module 118 is for generating an audio fingerprint for an audio signal by further transforming the audio signal. In one embodiment, the fingerprint generation module 118 receives the normalized matrix $B\times N_{fb}$ from the filtering module 116 and applies a two-dimensional (2D) Discrete Cosine Transform (DCT) to the matrix $B\times N_{fb}$ to get a matrix D of DCT coefficients.

From DCT coefficients in the matrix D, the fingerprint generation module 118 selects a subset of 64 coefficients to represent an audio fingerprint of the audio signal being processed. In one embodiment, the fingerprint generation module 118 selects first 4 even columns of the DCT coefficients from the DCT coefficients matrix D, which results in a 4×16 matrix $F_{sub}$ to represent the audio fingerprint. To represent the audio fingerprint $F_{sub}$ as a 64-bit integer, the fingerprint module 118 keeps only sign information of the selected DCT coefficients. The sign information of DCT coefficients is robust against quantization noise (e.g., scalar quantization errors) because positive signs of DCT coefficients do not change to negative signs and vice versa. In addition, the concise expression of DCT signs saves memory space to calculate and store them.

Figure 4:
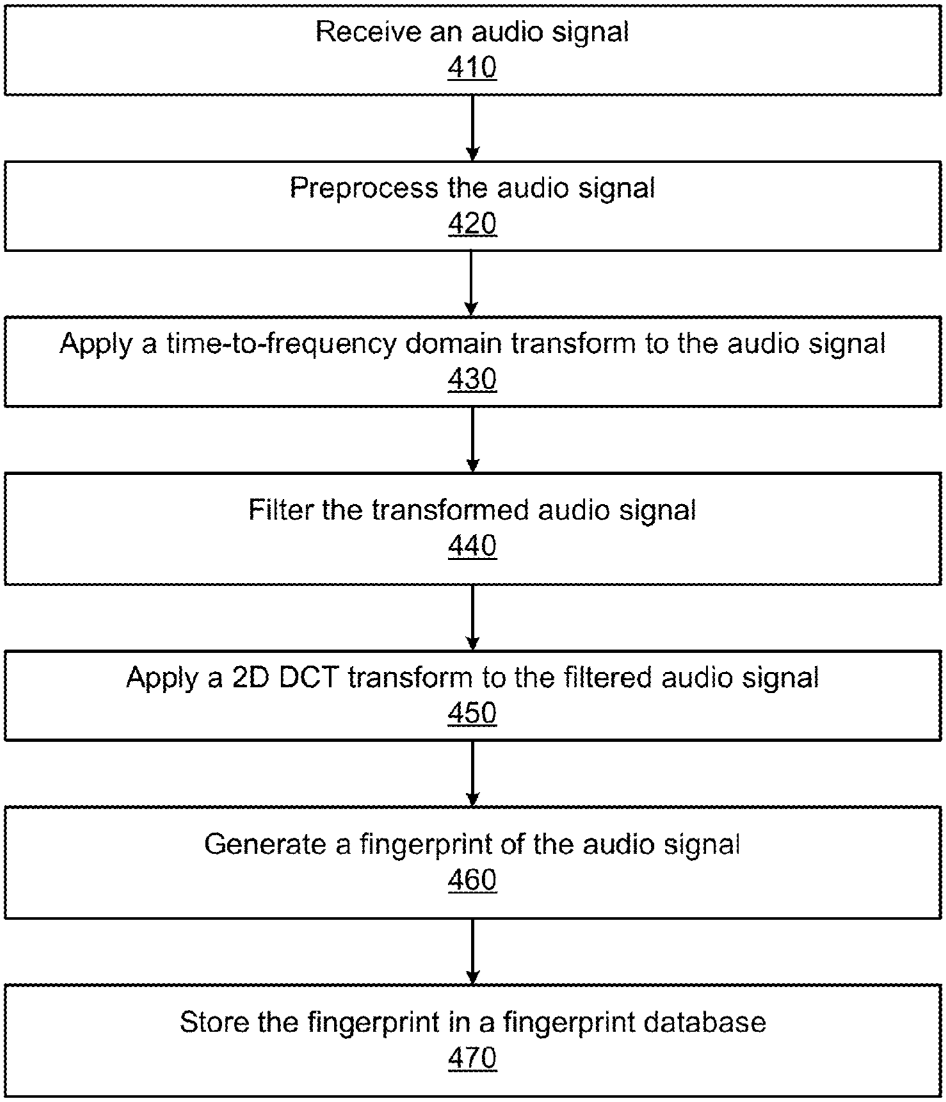
FIG. 4 is a flowchart of generating an audio signal fingerprint in accordance with an embodiment.

Turning now to FIG. 4, a flowchart is shown illustrating a process for generating an audio signal fingerprint in accordance with an embodiment of the invention. Initially, the audio fingerprint generation module 110 receives 410 an audio signal for audio fingerprint generation. The audio fingerprint generation module 110 preprocesses 420 the received audio signal by applying one or more operations to the audio signal, such as extracting metadata associated with the audio signal, normalizing the amplitude and dividing the audio signal into multiple audio frames.

To compactly represent the information contained in the audio signal, the audio fingerprint generation module 110 transforms the audio signal by applying 430 a time-to-frequency domain transform (e.g., STFT transform) to the audio signal. The audio fingerprint generation module 110 filters 440 the transformed audio signal by splitting each spectral frame of the transformed audio signal into multiple filter banks. Example filtering is to apply a 16-band third octave triangular filter bank to each spectral frame of the transformed audio signal and to obtain a matrix of 16×32 bins of spectral power of the corresponding spectral bandwidth.

The audio fingerprint generation module 110 applies 450 a 2D DCT transform to the filtered audio signal to obtain a matrix of 64 selected DCT coefficients. To balance efficient representation and computation complexity, the audio fingerprint generation module 110 only keeps the sign information of the selected DCT coefficients. The audio fingerprint generation module 110 generates 460 an audio fingerprint of the audio signal from the sign information of the selected DCT coefficients and represents the audio fingerprint as a 64-bit integer. In addition, the audio fingerprint generation module 110 stores 470 the generated audio fingerprint in a fingerprints database, e.g., the fingerprints database 130 as illustrated in FIG. 1.

After generating the probe audio fingerprint for the audio signal, the audio fingerprint generation module 110, in conjunction with the audio fingerprint matching module 120, performs one or more rounds of processing to detect pitch shifting in the audio signal. For example, the audio fingerprint generation module 110 generates DCT-based audio fingerprints for one or more reference audio signals by applying the similar steps as described above. The audio fingerprint matching module 120 selects a set of reference audio fingerprints to be compared with the probe audio fingerprint for detecting pitch shifting in the audio signal.

Audio Fingerprint Matching Based on DCT Sign-Only Correlation

Figure 5:
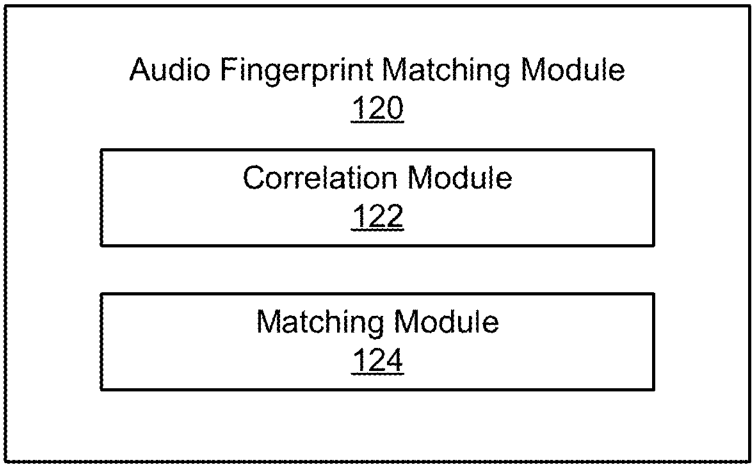
FIG. 5 is a block diagram of an audio fingerprint matching module in accordance with an embodiment.

FIG. 5 is a block diagram of an audio fingerprint matching module 120 in accordance with an embodiment of the invention. In the embodiment illustrated in FIG. 5, the audio fingerprint matching module 120 has a correlation module 122 and a matching module 124. Upon receiving a probe audio fingerprint of an audio signal generated by the audio fingerprint generation module 110, the audio fingerprint matching module 120 calculates a correlation between the probe audio fingerprint of the audio signal and a reference audio fingerprint stored in the fingerprints database 130. Responsive to multiple reference audio fingerprints, the audio fingerprint matching module 120 calculates the correlation between the probe audio fingerprint and each reference audio fingerprint. The audio fingerprint matching module 120 determines whether the audio signal is distorted (e.g., pitch shifted) based on the correlation analysis. In one embodiment, the correlation module 122 calculates a correlation between the probe audio fingerprint of the audio signal and a short list of reference audio fingerprints stored in the fingerprints database 130. The short list of reference audio fingerprints can be generated based on one or more features of the reference audio fingerprints, e.g., tempo, timbral shape and others.

The correlation module 122 is configured to calculate correlation between the probe audio fingerprint of the audio signal and a reference audio fingerprint. The correlation measures the similarity between the audio characteristics of the probe audio fingerprint and the audio characteristics of the reference audio fingerprint. In one embodiment, the correlation module 122 calculates the correlation between the probe audio fingerprint of the audio signal and the reference audio fingerprint by applying a DCT transform on the columns of DCT sign coefficients of the probe audio fingerprint and the reference audio fingerprint. For simplicity and clarity, this correlation is referred to as "DCT sign-only correlation."

Let $F_{sub}(i)$ be the i-th column of DCT coefficients of the probe audio fingerprint and $G_{sub}(i)$ be the i-th column of DCT coefficients of the reference audio fingerprint. $F_{sub}(i)$ and $G_{sub}(i)$ are generated by the audio fingerprint generation module 110 described above. Let DCT sign product $P_i$ be defined as follows in Equation (3):

$$P_i = F_{sub}(i) \cdot G_{sub}(i) \tag{3}$$

The correlation module 122 applies a DCT transform on the columns of DCT sign coefficients of $F_{sub}(i)$ and $G_{sub}(i)$ to calculate the correlation. In other words, the DCT sign-only correlation $C_i(k)$ of the DCT sign product $P_i$ is defined as follows in Equation (4):

$$C_i(k) = 2\sum_{n=0}^{N-1} P_i(n)\cos\left[\frac{\pi k}{2N}(2n+1)\right],\ k = 0, 1, 2, \ldots, N-1 \tag{4}$$

where N is the length of $P_i$. $P_i$ can be zero-padded to increase resolution. After obtaining $P_i$ values for all the columns of DCT sign coefficients, the correlation module 122 calculates the DCT sign-only correlation C as follows in Equation (5):

$$C(k) = \sum_{i=0}^{3} C_i(k) \tag{5}$$

The matching module 124 matches the probe audio fingerprint against a set of reference audio fingerprints. To match the probe audio fingerprint to a reference audio fingerprint, the matching module 124 measures the similarity between the audio characteristics of the probe audio fingerprint and the audio characteristics of the reference audio fingerprint based on the DCT sign-only correction between the probe audio fingerprint and the reference audio fingerprint. It is noted that there is a close relationship between the DCT sign-only correlation and the similarity based on phase-only correlation for image search. In other words, the similarity based on phase-only correlation is a special case of the DCT sign-only correlation. Applying this close relationship to the audio signal distortion detection, the DCT sign-only correlation between the probe audio fingerprint and the reference audio fingerprint closely approximates the similarity between the audio characteristics of the probe audio fingerprint and the audio characteristics of the reference audio fingerprint.

In one embodiment, the degree of the similarity or the degree of match between the audio characteristics of the probe audio fingerprint and the audio characteristics of the reference audio fingerprint is indicated by the absolute peak value of the DCT sign-only correlation function between the probe audio fingerprint and the reference audio fingerprint. For example, a high absolute peak value of the DCT sign-only correlation function between the probe audio fingerprint and the reference audio fingerprint indicates that the probe audio fingerprint matches the reference audio fingerprint. In other words, a pitch shifted audio signal can be identified as the same audio content as a reference audio signal in response to the DCT sign-only correlation function between the corresponding audio fingerprints of the audio signal and the reference audio signal having an absolute peak value higher than a predetermined threshold value.

In addition to measure the degree of match between the audio characteristics of the probe audio fingerprint and the audio characteristics of the reference audio fingerprint, the matching module 124 determines the degree of pitch shift of the audio signal with respect to the reference audio signal based on the position of the absolute peak value of the DCT sign-only correlation function defined in Equation (5) above. In one embodiment, a frequency multiplication factor R can be derived from the position f·R of the peak in C(k) as $$R = 2^{\frac{k_p}{6}}$$

in case of third-octave filter bank. In this case, frequency f in the probe fingerprint corresponds to frequency f·R in the reference fingerprint.

Figure 6:
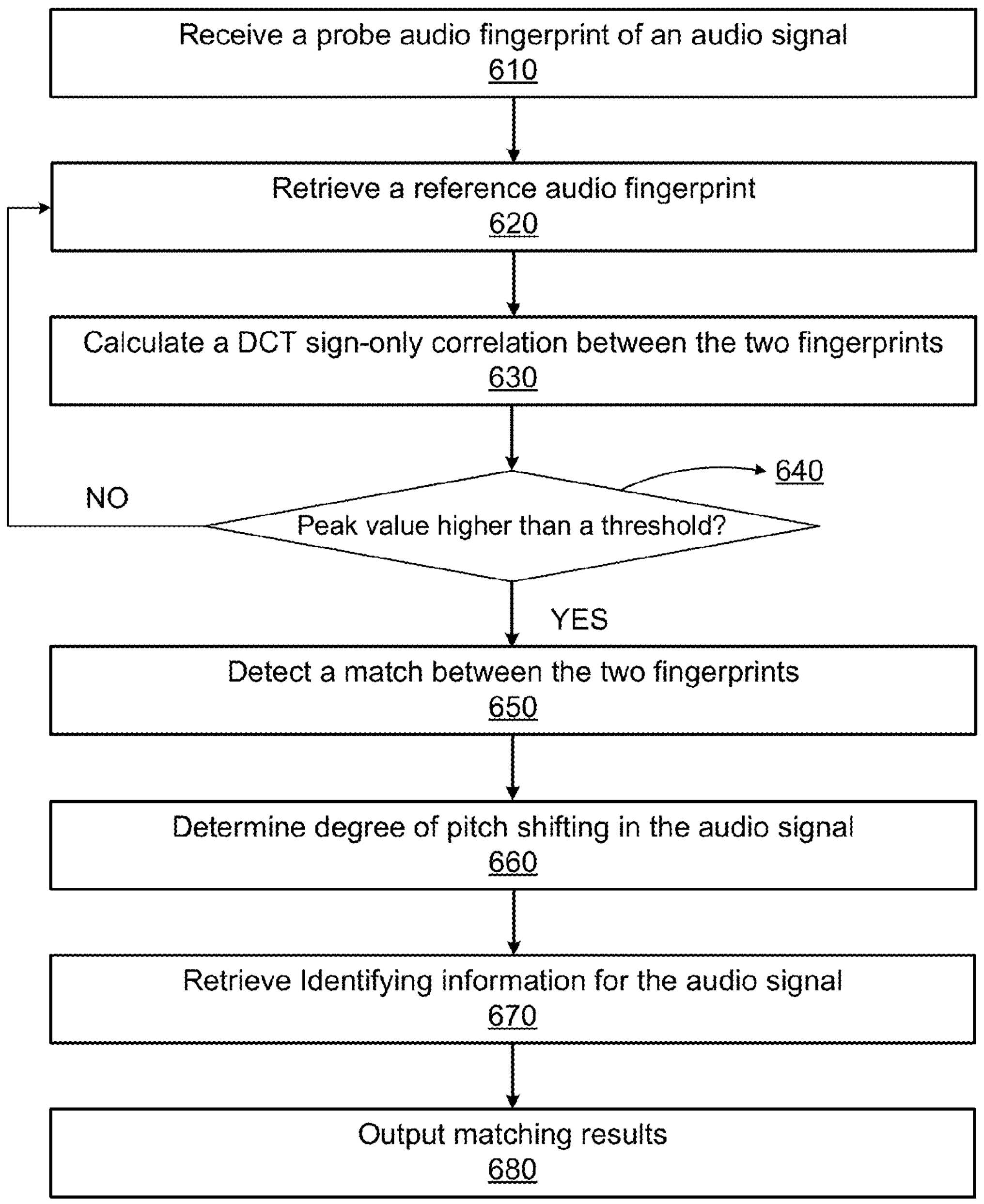
FIG. 6 is a flowchart of detecting distortion in an audio signal based on the audio fingerprint of the audio signal in accordance with an embodiment.

FIG. 6 is a flowchart of detecting pitch shifting in an audio signal based on the audio fingerprint of the audio signal in accordance with an embodiment of the invention. Initially, the audio fingerprint matching module 120 receives 610 a probe audio fingerprint of an audio signal, where the probe audio fingerprint is generated by the audio fingerprint generation module 110 described above. The audio fingerprint matching module 120 retrieves 620 a reference audio fingerprint for comparison and calculates 630 a DCT sign-only correlation between the probe audio fingerprint and the reference audio fingerprint according to the Equations (3)-(5) above.

The audio fingerprint matching module 120 determines 640 whether the absolute peak value of the DCT sign-only correlation function is higher than a predetermined threshold value. Responsive to the absolute peak value of the DCT sign-only correlation function being higher than the predetermined threshold value, the audio fingerprint matching module 120 detects 650 a match between the probe audio fingerprint of the audio signal and the reference audio fingerprint. On the other hand, responsive to the absolute peak value of the DCT sign-only correlation function being lower than the predetermined threshold value, the audio fingerprint matching module 120 retrieves another reference audio fingerprint and determines whether there is a match between the probe audio fingerprint and the newly retrieved reference audio fingerprint by repeating the steps 630-650.

As described above with reference to FIG. 5, a pitch shifted audio signal can be identified as the same audio content as a reference audio signal responsive to the audio fingerprint of the pitch shifted audio signal matching the audio fingerprint of the reference audio signal based on the DCT sign-only correlation analysis. In step 660, the audio fingerprint matching module 120 determines the degree of pitch shifting in the audio signal with respect to the reference audio signal based on the position of the absolute peak value of the DCT sign-only correlation function.

The audio fingerprint matching module 120 retrieves 670 identifying information associated with the reference audio fingerprint matching the probe audio fingerprint of the audio signal. The audio fingerprint matching module 120 may retrieve the identifying information from the audio fingerprints database 130, one or more external systems 203, and/or any other suitable entity. The audio fingerprint matching module 120 outputs 680 the matching results. For example, the audio fingerprint matching module 120 sends the identifying information to a client device 202 that initially requested identification of the audio signal 102. The identifying information allows a user of the client device 202 to determine information related to the audio signal 102. For example, the identifying information indicates that the audio signal 102 is produced by a particular device or indicates that the audio signal 102 is a song with a particular title, artist, or other information.

In one embodiment, the audio fingerprint matching module 120 provides the identifying information to the social networking system 205 via the network 204. The social networking system 205 may update a newsfeed or user's user profile, or may allow a user to do so, to indicate the user requesting the audio identification is currently listening to a song identified by the identifying information. In one embodiment, the social networking system 205 may communicate the identifying information to one or more additional users connected to the user requesting identification of the audio signal 102 over the social networking system 205.

Compared with conventional distance based similarity measurement for matching an audio signal to a reference audio signal, the DCT sign-only correlation between the audio fingerprint of the audio signal and a reference audio fingerprint can be used to improve the matching performance especially with robust matching rate for the audio signal with pitch shifting.

Figure 8A:
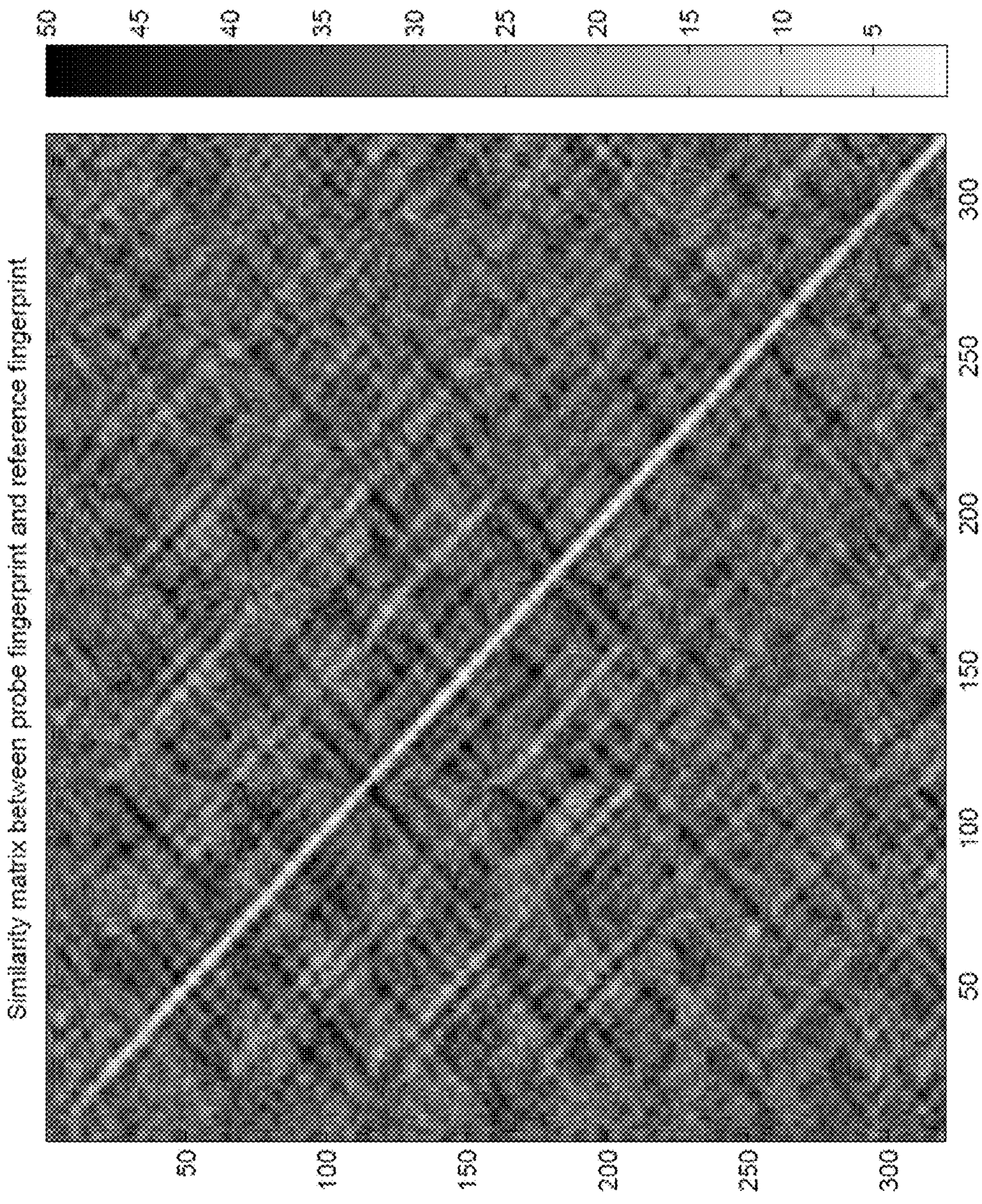
FIG. 8A is an example similarity matrix of an audio signal without distortion of pitch shifting.

FIG. 8A is an example similarity matrix of an audio signal without pitch shifting. In the example shown in FIG. 8A, the audio signal is a short musical excerpt and a pitch shifted version of the audio signal is produced for the illustration. FIG. 8A illustrates a similarity matrix representing a self-comparison, where the audio signal is compared with itself. Because there is no distortion from pitch shifting in the audio signal, a high matching rate based on Hamming distance is observed. In one embodiment, a similarity matrix_U_consists of_i rows and m columns where l is the number of frames in the probe fingerprint, while m is the number of frames in the reference fingerprint. Value $U_{i,j}$ is computed as the Hamming distance between frame i of the probe fingerprint and frame j of the reference fingerprint.

Figure 8B:
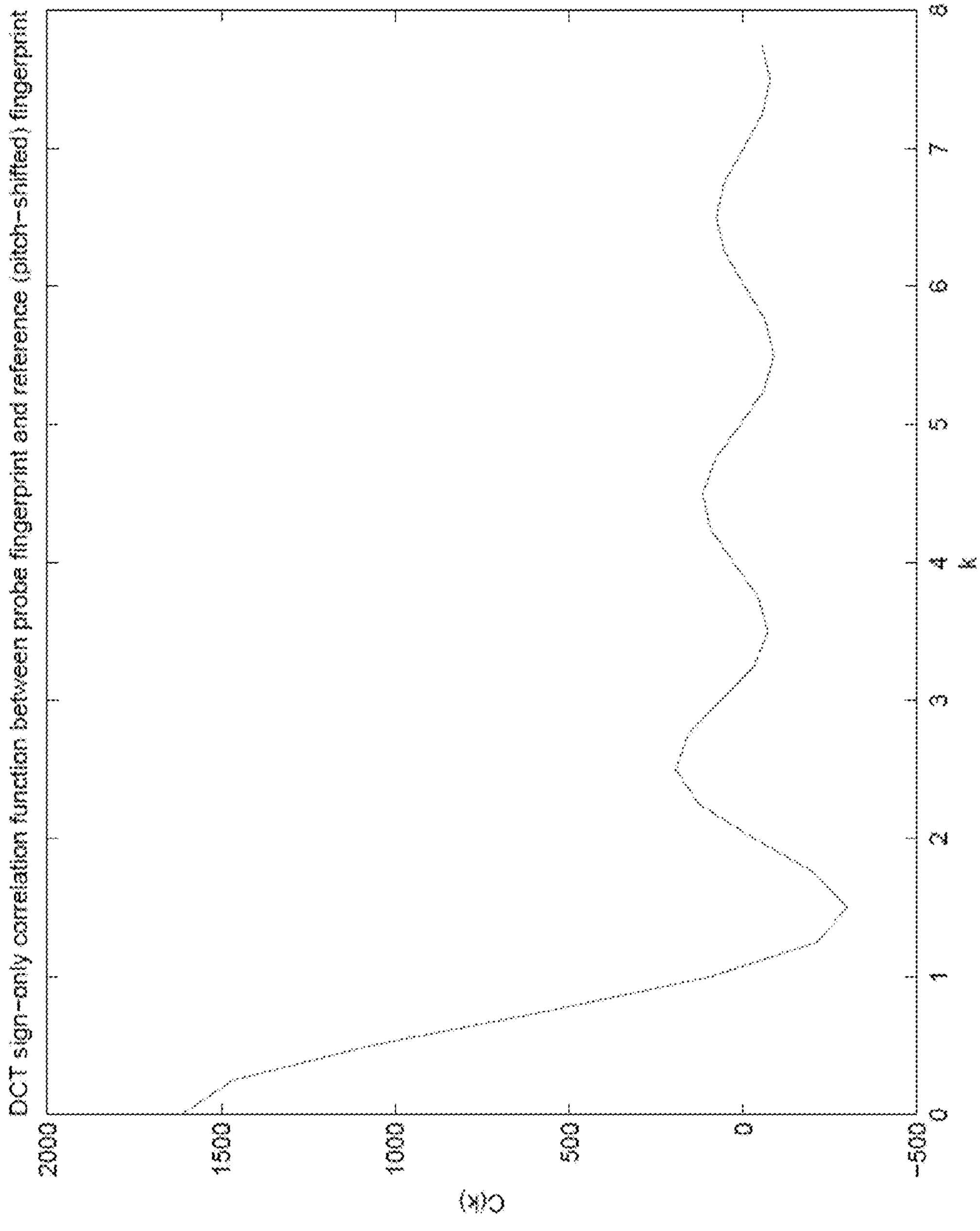
FIG. 8B is an illustration of discrete cosine transform (DCT) sign-only correlation corresponding to the similarity matrix illustrated in FIG. 8A.

FIG. 8B is an illustration of DCT sign-only correlation corresponding to the similarity matrix illustrated in FIG. 8A. The DCT sign-only correlation function between the audio fingerprints of same audio signal is calculated for matrix point [50, 50]. It is shown in FIG. 8B, the DCT sign-only correlation function has a high absolute peak value, which indicates that the two audio fingerprints of the audio signal match. Thus, the DCT sign-only correlation analysis confirms the match observed based on Hamming distance.

Figure 9A:
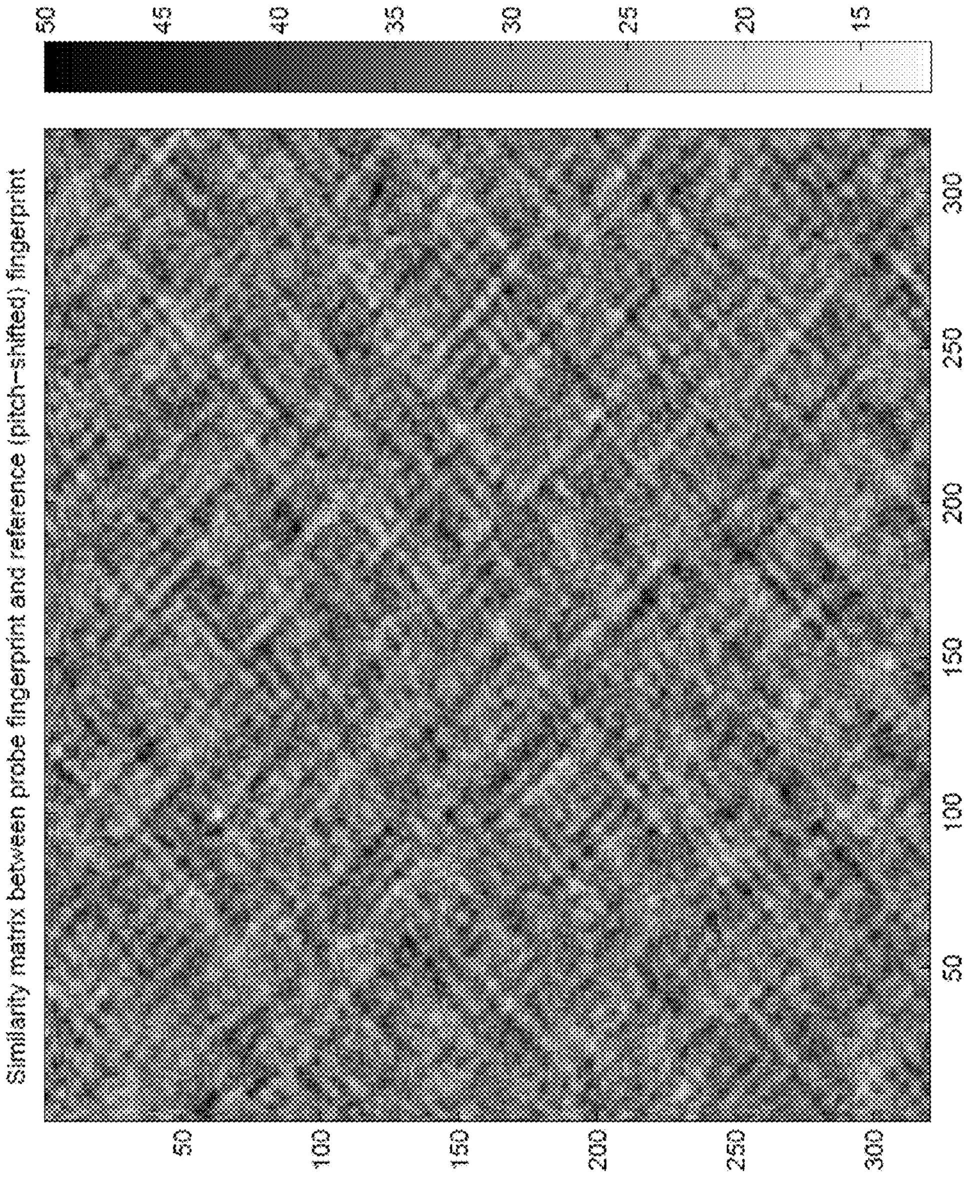
FIG. 9A is an example similarity matrix of an audio signal with 20% distortion of pitch shifting.

FIG. 9A is an example similarity matrix of an audio signal with 20% distortion of pitch shifting. The audio signal illustrated in FIG. 9A is the same short musical excerpt as illustrated in FIG. 8A, and the pitch shifted version of the audio signal has 20% distortion of pitch shifting. The similarity matrix between the audio signal and its 20% pitch shifted version is based on Hamming distance. The high amount of pitch shifting leads to significant changes in spectral content of the audio signal, resulting in high Hamming distance. Thus, the high matching rate is no longer observable as illustrated in FIG. 9A. The distance based matching algorithms would identify the pitch shifted version of the audio signal as different audio content from the audio signal.

Figure 9B:
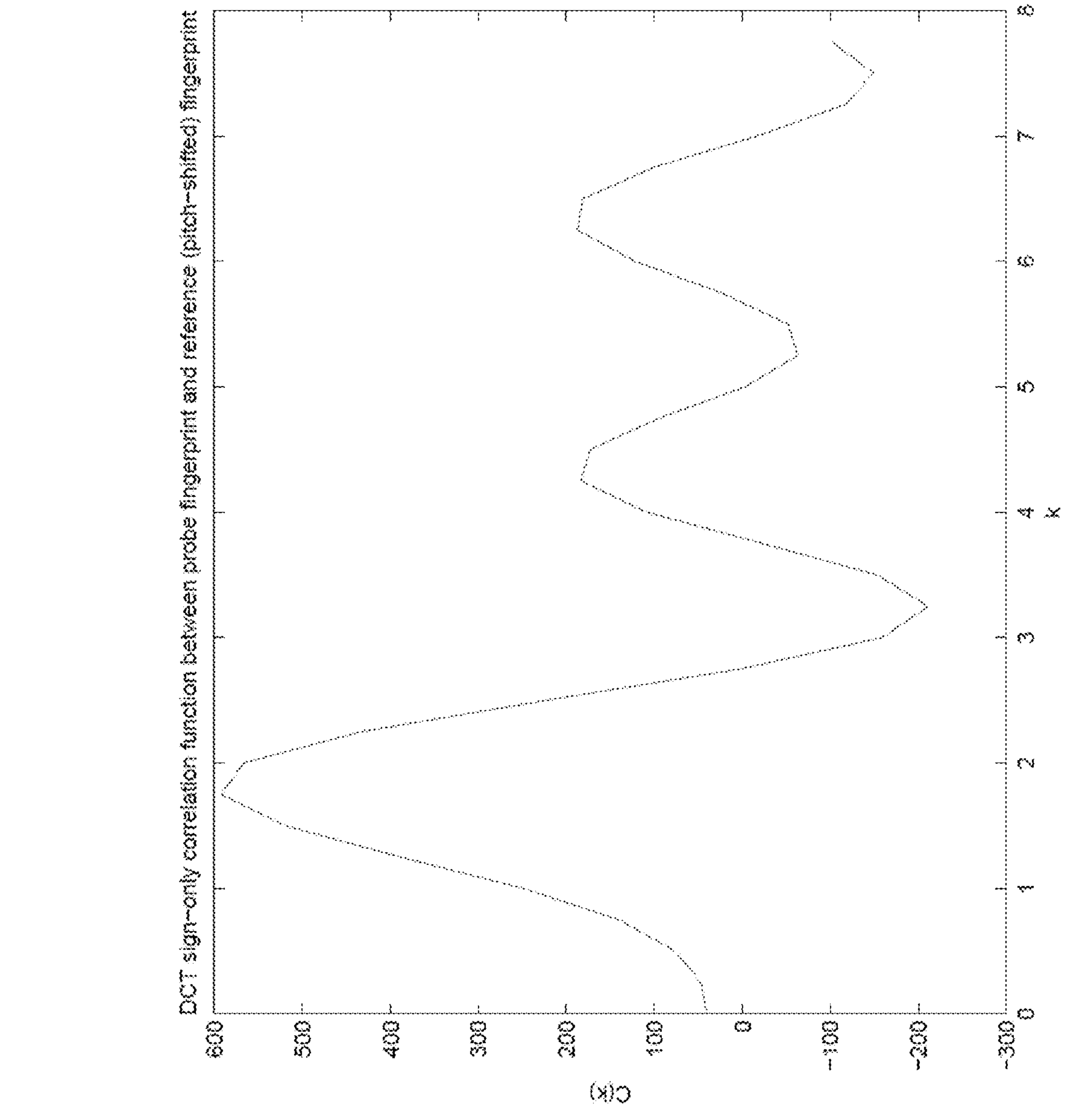
FIG. 9B is an illustration of DCT sign-only correlation corresponding to the similarity matrix illustrated in FIG. 9A.

On the other hand, the DCT sign-only correlation based on the matching algorithm allows an audio identification system to identify certain pitch shifted versions of an audio signal as the same audio content as the audio signal. FIG. 9B is an illustration of DCT sign-only correction corresponding to the similarity matrix illustrated in FIG. 9A. The DCT sign-only correlation function illustrated in FIG. 9B has a strong absolute peak value (e.g., higher than a predetermined threshold value), which indicates the 20% pitch shifted audio signal still matches the audio signal, i.e., having the same audio content, but its pitch being shifted from its original pitch. The degree of the pitch shift (e.g., 20%) can be determined by the position of the peak value in the DCT sign-only correlation function. Thus, the DCT sign-only correlation based matching can be used by the audio identification system for robust identification of pitch-shifted audio signals.

Applications of DCT Sign-Only Correlation Based Audio Fingerprint Matching

The DCT sign-only correlation based audio fingerprint matching has a variety of applications, such as for a user portable device to measure movement of the user. Existing audio devices taking advantage of the Doppler Effect often require tools in addition to audio signals to measure motion or movement of an object by detecting frequency and amplitude of waves emitted from the object. The DCT sign-only correlation based audio fingerprint matching may eliminate or reduce the reliance on the tools other than the audio signals themselves. For example, a user may talk on a phone while exercising with fitness equipment. The user movement can cause some distortion such as the pitch shifting in the audio signal of the phone conversation. Instead of using an accelerometer to measure the user movement, the distorted audio signal and a reference audio signal can be analyzed based on the DCT sign-only correlation between the corresponding audio fingerprints of the audio signals as described above to measure the movement.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

receiving an audio signal including a plurality of frames, each frame representing a portion of the audio signal;

generating a probe audio fingerprint based on one or more of the plurality frames;

selecting a reference audio fingerprint from a plurality of reference audio fingerprints;

calculating a correlation between the probe audio fingerprint and the selected reference audio fingerprint, the correlation approximating similarity between audio characteristics of the probe audio fingerprint and audio characteristics of the selected reference audio fingerprint;

obtaining position information of at least one absolute peak value of the calculated correlation between the probe audio fingerprint and the selected reference audio fingerprint;

determining an amount of pitch shifting in the received audio signal based on a position of the at least one absolute peak value;

responsive to the absolute peak value exceeding a threshold value, determining that the probe audio fingerprint matches the reference audio fingerprint; and outputting a signal indicating a degree of a match based on the determined amount of pitch shifting between the probe audio fingerprint and the selected reference audio fingerprint.

2. The computer-implemented method of claim 1, wherein generating the probe audio fingerprint of the audio signal comprises:

transforming one or more of the plurality of frames of the audio signal from a time domain to a frequency domain; and applying a two-dimensional discrete cosine transform (DCT) transform to the plurality of frames of the audio signal in the frequency domain; and generating the probe audio fingerprint from a predetermined number of DCT coefficients of the audio signal.

3. The computer-implemented method of claim 2, wherein generating the probe audio fingerprint from a predetermined number of the DCT coefficients of the audio signal comprises:

generating a matrix of DCT coefficients, each DCT coefficient having a representation of sign information;

selecting sign information of the predetermined number of DCT coefficients from the matrix of DCT coefficients; and generating the probe audio fingerprint of the audio signal from the sign information of the predetermined number of DCT coefficients, the probe audio fingerprint being represented as an integer having a predetermined number of bits.

4. The computer-implemented method of claim 1, wherein calculating the correlation between the probe audio fingerprint and the selected reference audio fingerprint comprises:

applying a two-dimensional discrete cosine transform to columns of DCT coefficients representing the probe audio fingerprint;

applying the two-dimensional discrete cosine transform to columns of DCT coefficients representing the reference audio fingerprint; and calculating a DCT sign-only correlation from the transformed columns of DCT coefficients representing the probe audio fingerprint and the transformed columns of DCT coefficients representing the reference audio fingerprint, the DCT sign-only correlation having the at least one absolute peak value and information of the position of the at least one absolute peak value.

5. The computer-implemented method of claim 1, wherein the absolute peak value of the calculated correlation indicates a degree of match between the audio characteristics of the probe audio fingerprint and the audio characteristics of the selected reference fingerprint.

6. The computer-implemented method of claim 5, wherein the absolute peak value of the calculated correlation higher than a threshold value indicates that the audio signal associated with the probe audio fingerprint has an audio content similar to that of a reference audio signal associated with the selected reference audio fingerprint.

7. The computer-implemented method of claim 1, further comprising:

obtaining position information of the at least one absolute peak value of the calculated correlation between the probe audio fingerprint and the selected reference fingerprint; and determining an amount of distortion in the audio signal based on the position of the absolute peak value of the correlation, the amount of distortion indicating how much a pitch of the audio signal has shifted from a pitch of a reference audio signal associated with the selected reference fingerprint; and outputting a signal indicating the amount of determined distortion in the audio signal.

8. The computer-implemented method of claim 1, further comprising:

responsive to the probe audio fingerprint matching the selected reference fingerprint, retrieving identifying information associated with the selected reference audio fingerprint; and associating the identifying information with the audio signal of the probe audio fingerprint.

9. A non-transitory computer-readable storage medium storing computer program instructions, executed by a computer processor, the computer program instructions comprising instructions for:

receiving an audio signal including a plurality of frames, each frame representing a portion of the audio signal;

generating a probe audio fingerprint based on one or more of the plurality frames;

selecting a reference audio fingerprint from a plurality of reference audio fingerprints;

calculating a correlation between the probe audio fingerprint and the reference audio fingerprint, the correlation approximating similarity between audio characteristics of the probe audio fingerprint and audio characteristics of the reference audio fingerprint;

obtaining position information of at least one absolute peak value of the calculated correlation between the probe audio fingerprint and the selected reference audio fingerprint;

determining an amount of pitch shifting in the received audio signal based on a position of the at least one absolute peak value;

responsive to the absolute peak value exceeding a threshold value, determining that the probe audio fingerprint matches the reference audio fingerprint; and outputting a signal indicating a degree of a match based on the determined amount of pitch shifting between the probe audio fingerprint and the selected reference audio fingerprint.

10. The computer readable storage medium of claim 9, wherein the computer program instructions for generating the probe audio fingerprint of the audio signal comprise instructions for:

transforming one or more of the plurality of frames of the audio signal from the time domain to the frequency domain;

applying a two-dimensional discrete cosine transform (DCT) transform to the plurality of frames of the audio signal in the frequency domain; and generating the probe audio fingerprint based on a predetermined number of two-dimensional discrete cosine transform (DCT) coefficients of the audio signal.

11. The computer-readable storage medium of claim 10, wherein the computer program instructions for generating the probe audio fingerprint from a predetermined number of the DCT coefficients of the audio signal comprise instructions for:

generating a matrix of DCT coefficients, each DCT coefficient having a representation of sign information;

selecting sign information of the predetermined number of DCT coefficients from the matrix of DCT coefficients; and generating the probe audio fingerprint of the audio signal from the sign information of the predetermined number of DCT coefficients, the probe audio fingerprint being represented as an integer having a predetermined number of bits.

12. The computer-readable storage medium of claim 9, wherein calculating a correlation between the probe audio fingerprint and the selected reference audio fingerprint comprises:

applying a two-dimensional discrete cosine transform to columns of DCT coefficients representing the probe audio fingerprint;

applying the two-dimensional discrete cosine transform to columns of DCT coefficients representing the reference audio fingerprint; and calculating a DCT sign-only correlation from the transformed columns of DCT coefficients representing the probe audio fingerprint and the transformed columns of DCT coefficients representing the reference audio fingerprint, the DCT sign-only correlation having the at least one absolute peak value and information of the position of the at least one absolute peak value.

13. The computer-readable storage medium of claim 9, wherein the absolute peak value of the calculated correlation indicates a degree of match between the audio characteristics of the probe audio fingerprint and the audio characteristics of the selected reference fingerprint.

14. The computer-readable storage medium of claim 13, wherein the absolute peak value of the calculated correlation higher than a threshold value indicates that the audio signal associated with the probe audio fingerprint has an audio content similar to that of a reference audio signal associated with the selected reference audio fingerprint.

15. The computer-readable storage medium of claim 9, further comprising computer program instructions for:

obtaining position information of the at least one absolute peak value of the calculated correlation between the probe audio fingerprint and the selected reference fingerprint; and determining an amount of distortion in the audio signal based on the position of the absolute peak value of the correlation, the amount of distortion indicating how much a pitch of the audio signal has shifted from a pitch of a reference audio signal associated with the selected reference fingerprint; and outputting a signal indicating the amount of determined distortion in the audio signal.

16. The computer-readable storage medium of claim 9, further comprising computer program instructions for:

retrieving identifying information associated with the selected reference audio fingerprint responsive to the probe audio fingerprint matching the selected reference fingerprint; and associating the identifying information with the audio signal.

* * * * *